United States Patent
Ekambaram et al.

(10) Patent No.: US 9,860,243 B2
(45) Date of Patent: *Jan. 2, 2018

(54) AUTHENTICATING APPLICATIONS USING A TEMPORARY PASSWORD

(71) Applicant: International Business Machines Corporation, Armonk, NY (US)

(72) Inventors: Vijay Ekambaram, Tamilnadu (IN); Ashish K. Mathur, Bangalore (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/811,948

(22) Filed: Jul. 29, 2015

(65) Prior Publication Data

US 2017/0034156 A1    Feb. 2, 2017

(51) Int. Cl.
*G06F 7/04*       (2006.01)
*H04L 29/06*    (2006.01)
(Continued)

(52) U.S. Cl.
CPC .......... *H04L 63/0838* (2013.01); *G06F 1/163* (2013.01); *G06F 3/016* (2013.01);
(Continued)

(58) Field of Classification Search
CPC ........... H04L 63/0846; H04L 63/0838; H04W 12/06; H04W 12/04; G06F 21/00; G06F 3/016; G06F 1/163
See application file for complete search history.

(56) References Cited

U.S. PATENT DOCUMENTS

| 6,720,860 B1 * | 4/2004 | Narayanaswami ..... G06F 21/31 340/5.54 |
| 8,106,890 B2 | 1/2012 | Do et al. |

(Continued)

FOREIGN PATENT DOCUMENTS

| WO | 2006044717 A2 | 4/2006 |
| WO | 2014141263 A1 | 9/2014 |

OTHER PUBLICATIONS

Sebastian et al. "Tactile One-Time Pad Smartphone Authentication Resilient Against Shoulder Surfing," Technical Report TR-HGI-2014-003, Sep. 2014, pp. 1-33.*

(Continued)

*Primary Examiner* — Luu Pham
*Assistant Examiner* — Canh Le
(74) *Attorney, Agent, or Firm* — Jay Wahlquist

(57) ABSTRACT

A mobile device can receive, from an application installed on a wearable device, an authentication query. Based upon the authentication query, an application installed on the mobile device can be determined to have been authenticated. In response to determining that the application installed on the mobile device has been authenticated, a temporary password can be generated at the mobile device and converted into a vibration pattern. The vibration pattern can be vibrated at the mobile device. The temporary password can be transmitted from the mobile device to the wearable device for use in authenticating the application installed on the wearable device.

20 Claims, 5 Drawing Sheets

(51) Int. Cl.
*G06F 1/16* (2006.01)
*G06F 3/01* (2006.01)
*G06F 21/00* (2013.01)
*H04W 12/04* (2009.01)
*H04W 12/06* (2009.01)

(52) U.S. Cl.
CPC ............ *G06F 21/00* (2013.01); *H04W 12/04* (2013.01); *H04W 12/06* (2013.01)

(56) References Cited

U.S. PATENT DOCUMENTS

| | | | |
|---|---|---|---|
| 8,266,441 | B2 | 9/2012 | Inskeep et al. |
| 8,533,475 | B2 | 9/2013 | Frikart et al. |
| 8,627,424 | B1 | 1/2014 | O'Malley et al. |
| 8,749,361 | B2 | 6/2014 | Najafi et al. |
| 8,752,148 | B1 | 6/2014 | Vipond et al. |
| 2009/0179779 | A1 | 7/2009 | Katayama et al. |
| 2013/0014237 | A1 | 1/2013 | Krogh |
| 2015/0120342 | A1 | 4/2015 | Dragon et al. |
| 2015/0193217 | A1* | 7/2015 | Xiang ................... G06F 8/61 717/174 |
| 2016/0086176 | A1* | 3/2016 | Silva Pinto .......... G06Q 20/401 705/44 |

OTHER PUBLICATIONS

Nitesh Saxena et al., "Vibrate-to-Unlock: Mobile Phone Assisted User Authentication to Multiple Personal RFID Tags," 2100 IEEE, pp. 181-188.*

Rainhard Dieter Findling et al. "Towards Device-to-User Authentication: Protecting Against Phishing Hardware by Ensuring Mobile Device Authenticity using Vibration Patterns," 2015, The 14th International Conference on Mobile and Ubiquitous Multimedia, pp. 131-135.*

Ekambaram, et al., "Authenticating Applications Using a Temporary Password", U.S. Appl. No. 14/811,988. filed Jul. 29, 2015.

Fontana, "Researchers Build Invisible Passwords with Vibrations, Sounds, Flashing Lights", Identity Matters, Apr. 11, 2012. 10:51 GMT. http://www.zdnet.com/article/researchers-build-invisible-passwords-with-vibrations-sounds-flashing-lights/ 4 pages. Last Printed Apr. 30, 2015 11:20 AM.

List of IBM Patents or Patent Applications Treated as Related. Filed Jul. 29, 2015. 2 pages.

Mell, et al., "The NIST Definition of Cloud Computing", Recommendations of the National Institute of Standards and Technology. NIST Special Publication 800-145, Sep. 2011. 7 pages.

Ullenbeck et al., "Tactile One-Time Pad Smartphone Authentication Resilient Against Shoulder Surfing", Technical Report TR-HGI-2014-003, Sep. 2014. pp. 1-33.

Saxena et al. "Vibrate-to-Unlock: Mobile Phone Assisted User Authentication to Multiple Personal RFID Tags", 2011 IEEE International Conference on Pervasive Computing and Communications (PerCom), Seattle (Mar. 21-25, 2011). 8 pages.

Findling et al., "Towards Device-to-User Authentication: Protecting Against Phishing Hardware by Ensuring Mobile Device Authenticity using Vibration Patterns", The 14th International Conference on Mobile and Ubiquitous Multimedia (MUM 2015), Nov. 30,-Dec. 2, 2015, Linz, Austria. 5 pages.

* cited by examiner

AUTHENTICATING APPLICATIONS USING A TEMPORARY PASSWORD

BACKGROUND

The present disclosure relates generally to mobile devices, and more particularly, to authenticating applications on a wearable device. Wearable devices (e.g., wearable computers) can interweave technology into everyday life, causing technology to become more pervasive and convenient.

SUMMARY

Aspects of the disclosure provide a method, system, and computer program product for facilitating authentication of an application on a wearable device utilizing a temporary password. The method, system, and computer program product can include receiving an authentication query from an application installed on a wearable device at a mobile device. Based upon the authentication query, it can be determined that an application installed on the mobile device which corresponds to the application installed on the wearable device has been previously authenticated. In response to determining that the application on the mobile device has been previously authenticated, a temporary password can be generated at the mobile device. The temporary password can be generated according to password generation parameters which limit one or more characteristics of the temporary password based on predetermined rules for converting temporary passwords to vibration patterns. The temporary password can be converted at the mobile device into a vibration pattern. The vibration pattern can correspond to the temporary password according to the predetermined rules for converting temporary passwords to vibration patterns. The vibration pattern corresponding to the temporary password can be vibrated at the mobile device. The temporary password can be transmitted to the wearable device for use in authenticating the application on the wearable device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
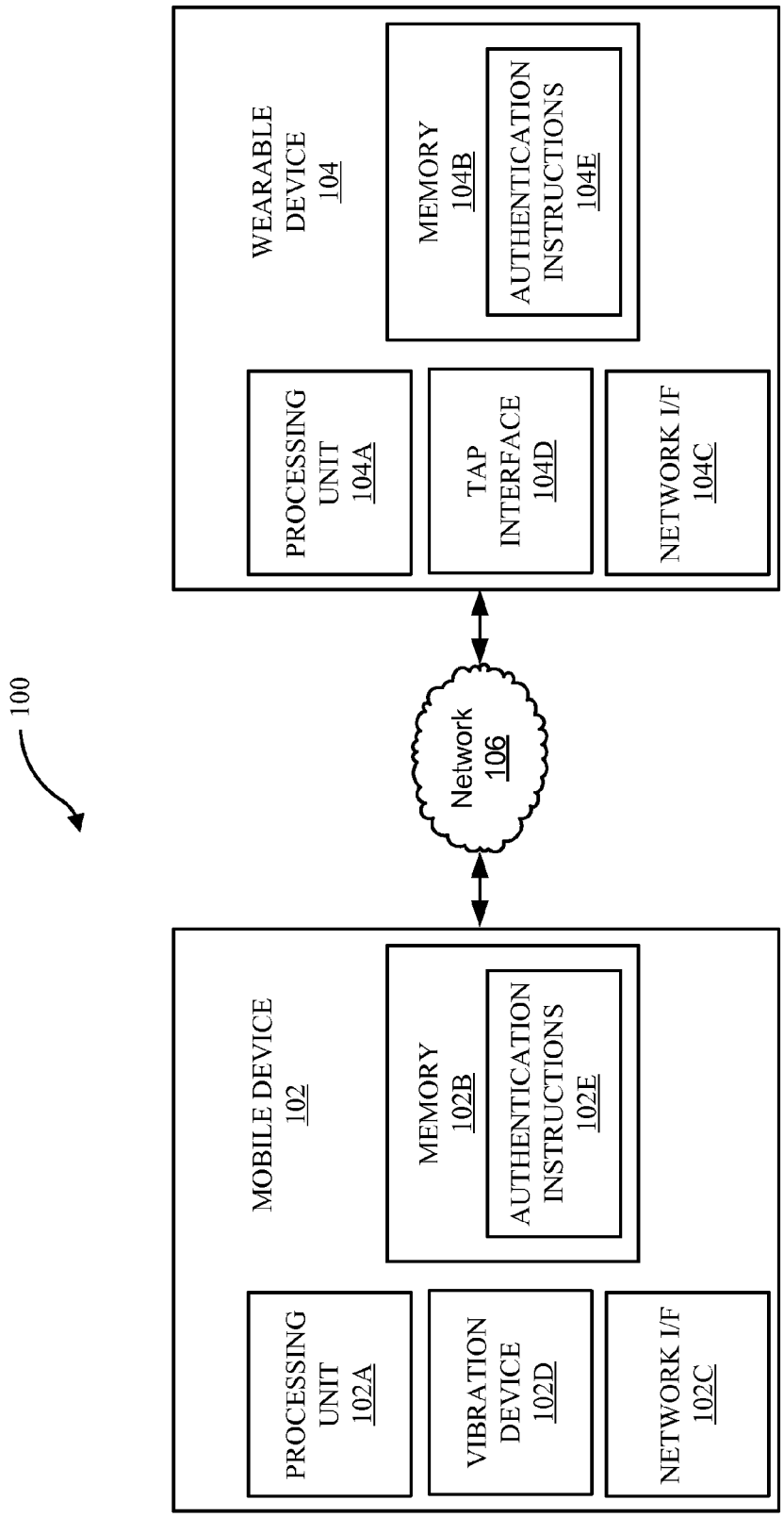
FIG. 1 depicts a block diagram of a system for authenticating applications on a wearable device utilizing a temporary password, according to embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to mobile and wearable devices. In various embodiments, more particular aspects relate to authenticating applications installed on wearable devices. While the present disclosure is not necessarily limited to such applications, various aspects of the disclosure can be appreciated through a discussion of various examples using this context.

Wearable technology is related to both the field of ubiquitous computing and the development of wearable computers. By utilizing ubiquitous computing, wearable computers can interweave technology into everyday life, causing technology to become more pervasive and convenient. Wearable computers (herein after referred to as "wearable devices") are miniature electronic devices that are worn by a user (e.g., under, with, or on top of clothing). This class of wearable technology has continued to develop for general or special purposes. For example, wearable computers have been used to monitor and provide real time feedback for athletes.

Wearable devices can be useful for applications which can require more complex computational support than simple hardware coded logics. For example, Google Glass® (Google Glass is a registered trademark of Google Inc. of Mountain View, Calif.) can combine innovative displays with some gestural movements for interactions. Wearable devices can also be customized for a user by installing "mobile apps" on the wearable device. A mobile app (short for the term "application software" and hereinafter referred to as an "application") is a computer program designed to run on smartphones, tablet computers, and other mobile devices (e.g., wearable devices). Applications are usually available through an application distribution platform, and are typically operated by the owner of the mobile operating system, such as Google Play®.

As wearable technology becomes more available, the amount of information stored within wearable devices can put users at risk to potential privacy threats. For example, wearable devices can capture and collect detailed information regarding our health, lifestyle choices, daily routines, as well as our current location at any point in time. Applications installed on wearable devices can also contain sensitive information, such as bank account numbers (e.g., from a mobile banking application) and personal emails.

In order to protect information stored within wearable and mobile devices, applications installed on the wearable and mobile devices are typically first authenticated by a user. For example, two-factor authentication provides unambiguous identification of users by means of a combination of two different components. These components can be something that the user knows, something that the user possesses, and/or something that is inseparable from the user. For example, two-factor authentication has utilized mobile phones as "something the user possesses." If users want to authenticate an application themselves, they can use their personal access license (i.e., something that only the individual user knows) plus a one-time password (OTP) which is sent to the mobile device of the user through a short message service (SMS) or a customized application.

An OTP is a password that is valid for only one login session or transaction, on a computer system or other digital device. An advantage that is addressed by OTPs is that, in contrast to static passwords (e.g., passwords which do not change), they are not vulnerable to replay attacks. However, when mobile devices are utilized to receive OTPs, typically a user has to view the screen of the mobile phone to be able to view the OTP, which can be a problem, for example, the visually impaired or for those who are concerned about "shoulder surfers" (e.g., a person who looks over the shoulders of the user to obtain the OTP). Furthermore, some wearable devices such as Google Glass® or Apple Watch® (Apple Watch is a registered trademark of Apple Inc. of Cupertino, Calif.) often don't have a keypad that would allow a user to enter an OTP.

Aspects of the present disclosure provide a method for facilitating authentication of an application installed on a wearable device utilizing a temporary password. The method can include receiving an authentication query from an application installed on the wearable device at a mobile device. In various embodiments, the application installed on the wearable device can be the same application as that installed on the mobile device or an application corresponding to an application installed on the mobile device. For example, a service provider may make available one version of an application for a mobile device and another version for a wearable device. Although the application installed on the wearable device does not contain identical code as the application installed on the mobile, in this example, the application installed on the wearable device still corresponds to the application installed on the mobile device. Thus, as used herein, "corresponding applications" include applications on different devices having identical code as well as applications on different devices which do not have identical code, but are configured for similar functions or to communicate with each other.

In some embodiments, an authentication query is a determination as to whether or not the application installed on the mobile device has been previously authenticated. In certain embodiments, the application installed on the wearable device has not been authenticated.

Based upon the authentication query, it can be determined at the mobile device that the application installed on the mobile device has been previously authenticated. In response to determining that the application installed on the mobile device has been previously authenticated, a temporary password (e.g., an OTP) can be generated at the mobile device. In various embodiments, generating a temporary password can include generating the temporary password according to password generation parameters which limit one or more characteristics of the temporary password based on predetermined rules for converting temporary passwords to vibration patterns.

The temporary password can be converted at the mobile device into a vibration pattern using an Easy-Mobile-agent. In various embodiments, an Easy-Mobile-agent is a software application previously installed on a mobile device used to receive and convert OTPs into vibration patterns. In certain embodiments, the temporary password can include a first digit, a second digit, and a third digit. In additional embodiments, the length of the temporary password can correspond to a security level requirement. For example, the length of the temporary password can be affected by the sensitivity of information stored within the application attempting to be accessed.

In various embodiments, a vibration pattern is a physical representation of a temporary password which is tactilely communicated to a user. For example, a user can feel the vibration pattern when the mobile phone is in their pocket. In some embodiments, converting the temporary password into the vibration pattern can include converting the temporary password into a first vibration pattern, a second vibration pattern, and a third vibration pattern. The first, second, and third vibrations patterns can correspond to a first digit, a second digit, and a third digit, respectively. In other embodiments, the first, second, and third vibration patterns can each be separated by a pause.

The vibration pattern corresponding to the temporary password can be vibrated at the mobile device using a vibration device. In response to vibrating the vibration pattern, the method can include transmitting the temporary password to the wearable device for use in authenticating the application installed on the wearable device.

FIG. 1 depicts a block diagram of a system 100 for authenticating applications on a wearable device utilizing a temporary password, according to embodiments. The system 100 includes a mobile device 102, a wearable device 104, and a network 106. In certain embodiments, the mobile device 102 and the wearable device 104 can be distant from each other and communicate over the network 106. In other embodiments, the mobile device 102 and the wearable device 104 need to be within a predetermined distance from one another in order to authenticate the wearable device 104. Furthermore, in some embodiments, the mobile device 102 and the wearable device 104 communicate with each other directly utilizing other communication mediums discussed herein rather than communicating via the network 106. The mobile device 102 and the wearable device 104 each include a processing unit 102A/104A, a memory 102B/104B, and a network interface (I/F) 102C/104C. The mobile device 102 further includes a vibration device 102D whereas the wearable device 104 further includes a tap interface 104D.

In certain embodiments, the network 106 can be implemented by any number of any suitable communications media (e.g., wide area network (WAN), local area network (LAN), Internet, intranet, etc.). Alternatively, the mobile device 102 and the wearable device 104 can be local to each other, and communicate via any appropriate local communication medium (e.g., local area network (LAN), hardwire, wireless link, Intranet, etc.). In certain embodiments, the network 106 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

The processing units 102A/104A can execute the authentication instructions 102E/104E stored in the memories 102B/104B, respectively. In certain embodiments, the processing units 102A/104A can communicate with each other as well as other components within the mobile device 102 and the wearable device 104, such as the vibration device 102D and the tap interface 104D, in order to execute the authentication instructions 102E/104E stored within the memories 102B/104B. The processing units 102A/104A can include various types of processors such as, digital signal processor (DSP) hardware, network processor, application specific integrated circuit (ASIC), field programmable gate array (FPGA), or other types of processors. The memories 102B/104B can be coupled to the processing units 102A/104A via a memory bus. In various embodiments, the authentication instructions 102E/104E are configured, when executed by the processing units 102A/104A, to perform one or more of the functions described herein for enabling authentication of the wearable device 104.

The memories 102B/104B can include a random-access semiconductor memory, storage device, or storage medium (either volatile or non-volatile) for storing or encoding data and programs. The memories 102B/104B can be conceptually a single monolithic entity, but in some embodiments, the memories 102B/104B can be a more complex arrangement, such as a hierarchy of caches and other memory devices. The memories 102B/104B can store data, instructions, modules, and other types of information. In some embodiments, the memories 102B/104B can be on different devices and can be accessed remotely, e.g., via the network 106.

The network I/Fs 102C/104C can utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link between the mobile device 102 and the wearable device 104.

The vibration device 102D in the mobile device 102 can be configured to convert OTPs into a vibration pattern based on signals received from the processor 102A. The vibration device 102D can be capable of vibrating the mobile device 102 according to a converted vibration pattern. In certain embodiments, OTPs can be converted at the mobile device 102 into a vibration pattern using an Easy-Mobile-agent executed by the processor 102A. The Easy-Mobile-agent can access received OTP messages (e.g., a short message service) at the mobile device 102 in order to analyze the OTP. For example, if an OTP message is received at the mobile device 102 through email, the Easy-Mobile-agent can access the email application in order to analyze and convert the OTP. In other embodiments, the Easy-Mobile-agent can access the memory 102B in order to analyze and convert a received OTP.

In some embodiments, converting OTPs into a vibration pattern can include converting an OTP into a first vibration pattern, a second vibration pattern, and a third vibration pattern. For example, if an OTP is received as a numerical sequence, such as 132, each digit within the numerical sequence can have its own vibration pattern. For instance, the Easy-Mobile-agent can convert a numerical sequence 132 into the following pattern: <vibrate><gap for 2 seconds><vibrate><vibrate><vibrate><gap for 2 seconds><vibrate><vibrate>. This conversion can allow a user to receive and input an OTP into a wearable device without having to actually view the OTP message.

In various embodiments, a vibration pattern can further include a level of intensity associated with the authentication parameters of an application. For example, a vibration pattern corresponding to an OTP "132" can vary the level of intensity of vibration for each digit, such as a high frequency vibration, a medium frequency vibration, and a low frequency vibration, for a specific application requiring authentication. For instance, a numerical sequence 132 can be converted into the following vibration pattern to authenticate an application containing sensitive information: <high frequency vibration><gap for 2 seconds><medium frequency vibration><medium frequency vibration><medium frequency vibration><gap for 2 seconds><low frequency vibration><low frequency vibration>. By varying the level of intensity for each vibration pattern, a combination of different vibration frequencies can be used depending on the sensitivity of the information available through the application requiring authentication. As used herein, a definition of "digit" is to be interpreted expansively to include numbers, symbols, characters, expressible icons, and the like. A digit can be any individual unit or element that a user can input into the tap interface 104D described herein. This includes digits from zero to nine and symbols traditionally on a number pad (e.g., the "*" and the "#" signs). In certain embodiments, symbols traditionally on a number pad, such as "#", can correspond to a specific vibration pattern or frequency, such as a high vibration frequency.

The tap interface 104D of the wearable device 104 can include any surface of the wearable device 104 configured to detect and receive physical contact from a user. The tap interface 104D can be configured to receive input corresponding to an OTP. For example, an OTP of "132" can correspond to a user touching the tap interface 104D once, pause, three times, pause, and then two times. In further embodiments, the amount of time a user interacts with the tap interface can correspond to a symbol from an OTP. For example, an OTP of "1*1" can correspond to a user touching the tap interface 104D once, pause, once for 3 seconds, pause, and once.

In various embodiments, the mobile device 102 can send the OTP to the wearable device 104 for comparison with the input received via the tap interface 104D through the network 106. In certain embodiments, the mobile device 102 can send the OTP to the wearable device 104 directly using communication mediums discussed herein. In further embodiments, the mobile device 102 can send the OTP to the wearable device 104 as soon as the mobile device 102 and the wearable device 104 are within a predetermined distance. In some embodiments, the tap interface 104D can be a display. In certain embodiments, physical contact with the tap interface 104D is not necessary as physical proximity of a contact instrument (e.g., a stylus) to the surface of the wearable device 104 is sufficient. For example, many "touch sensitive" computing tablets (especially those having a glass, non-flexible display) are coupled magnetically to a stylus, where motions of the stylus can be interpreted when within a half-inch or so of the display surface. The tap interface 104D can be an integrated component of the wearable device 104. In other embodiments, the tap interface 104D can be an input-only component, such as force sensitive resistor (FSR) or a notebook touchpad.

Figure 2:
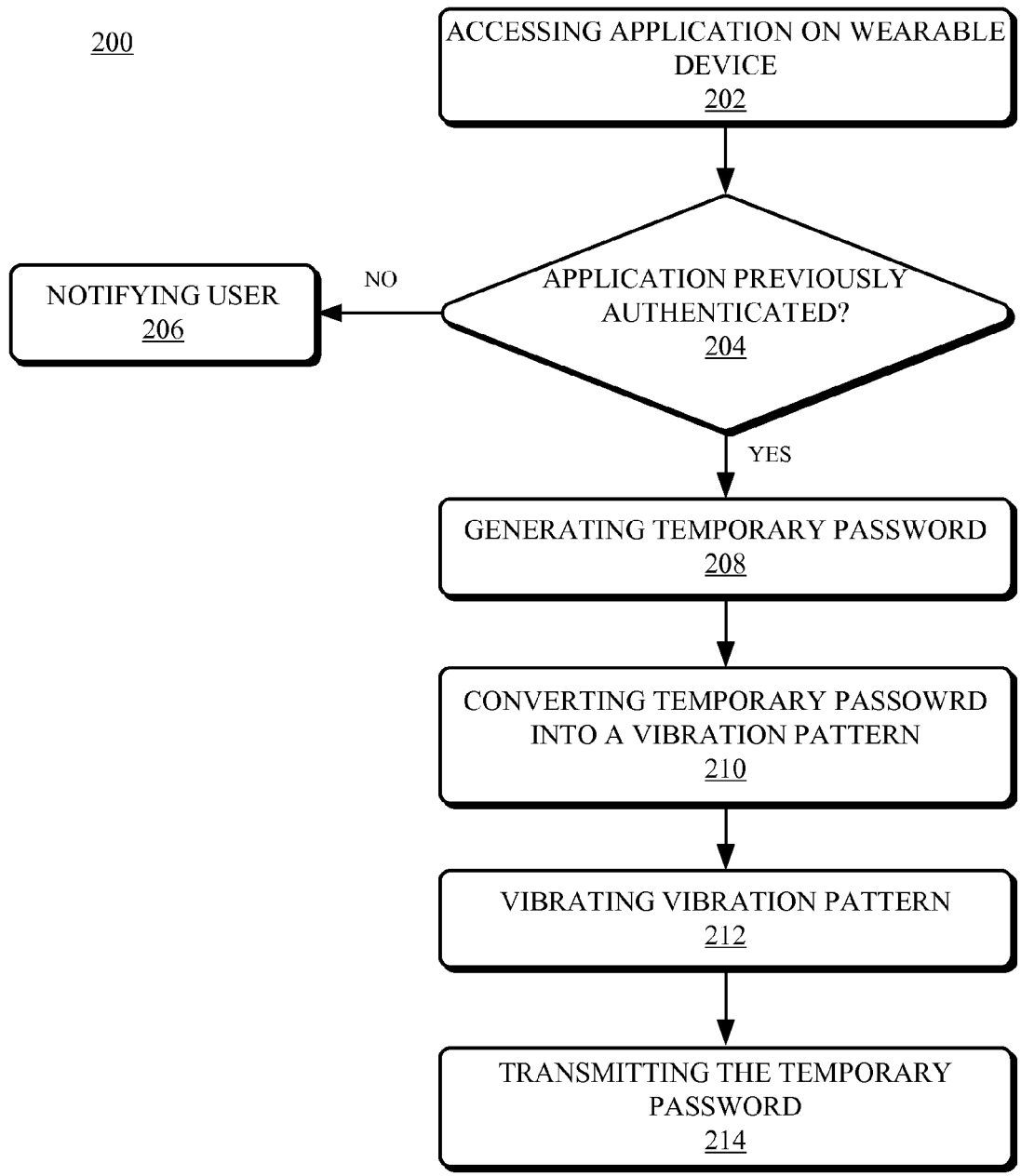
FIG. 2 depicts one embodiment of an example process for authenticating applications using a temporary password.

FIG. 2 depicts one embodiment of an example process 200 for authenticating applications using a temporary password, according to embodiments. It is to be understood that the order in which the blocks described below are discussed is not to be construed as limiting the order in which the individual acts may be performed. In particular, the acts performed may be performed simultaneously or in a different order than that discussed. The process 200 can begin at block 202 where an application installed on a wearable device is accessed by a user. In various embodiments, the application installed on the wearable device can correspond to an application installed on a mobile device. In certain embodiments, the application installed on the wearable device can be the same application installed on the mobile device. In some embodiments, accessing an application installed on a wearable device can include a request by the application to a user for authentication before access can be granted to the application. In various embodiments, one or more of the acts described with respect to the process 200 can be implemented via a processor executing instructions stored on a computer readable medium, such as the authentication instructions 102E/104E discussed above with respect to FIG. 1.

At block 204, the application installed on the wearable device performs an authentication query. In certain embodiments, performing an authentication query can include the application installed on the wearable device communicating with the application installed on the mobile device to determine whether or not the application on the mobile device has been previously authenticated. For example, if an application on a wearable device is a social media platform, the social media platform application on the wearable device can query the corresponding social media platform application on the mobile device. If the application installed on the mobile device has not been previously accessed, and subsequently not authenticated by a user, the process 200 can notify the user at block 206, discussed further herein.

If the application installed on the mobile device has been previously accessed, and subsequently authenticated by a user, the application installed on the mobile device generates a temporary password at block 208. In some embodiments, the temporary password can be an OTP. In various embodiments, each digit in the OTP can be limited to a predetermined numerical range. For example, in some embodiments, each digit is limited to the numerical range from "1" to "3". In other embodiments, a limit is not implemented on the numerical range for each digit. Additionally, in certain embodiments, the OTP can include symbols. In further embodiments, the length of the OTP can be dependent on the security level requirement for the application being authenticated. For example, an application containing sensitive information can require a longer OTP, and therefore, a generated OTP for such an application could be "13231."

In certain embodiments, the total number of digits of the temporary password can be limited to a predetermined amount. For example, in some embodiments, the OTP for mobile phones implementing the method 200 is limited to three digits. Furthermore, in some embodiments, the value for each digit in the temporary password is limited to one of a sub-set of available values. For example, the value of each digit can be limited to one of the numbers "1", "2", and "3" which is a sub-set of the numerical values of 0-9. In addition, in some embodiments, each possible value for the digits of the temporary password can have a predetermined association with a vibration pattern. For example, the value "1" has a predetermined association with a first vibration pattern, the value "2" has a predetermined association with a second vibration pattern, and so forth. In further embodiments, the predetermined association between the possible values and the respective vibration patterns can be fixed. For example, the predetermined association can be fixed for all users. In various embodiments, the term "fixed" can be understood to mean that once the associations between the possible values for digits of the temporary password and the respective vibration patterns have been determined, the respective associations do not change from user to user of the same mobile device and/or from generation of a first OTP to a generation of a second OTP.

At block 210, the temporary password generated by the application installed on the mobile device is converted into a vibration pattern. In some embodiments, the temporary password can be converted by an Easy-Mobile-agent. In addition, in some embodiments, the length of the vibration pattern can correspond to the authentication parameters of the application. For instance, continuing the example above where the application containing sensitive information required a longer OTP of "13231", the converted vibration pattern can be the following pattern: <vibrate><gap for 2 seconds><vibrate><vibrate><vibrate><gap for 2 seconds><vibrate><vibrate><vibrate><vibrate><vibrate> <gap for 2 seconds><vibrate>. In certain embodiments, if an OTP contains a symbol, such as "*", it can correspond to a specific vibration frequency. For example, if an OTP was "1*1", the converted vibration pattern can be the following pattern: <vibrate><gap for 2 seconds><high frequency vibrate><gap for two seconds><vibrate>.

At block 212, the vibration pattern converted from a temporary password is vibrated at the mobile device. In some embodiments, a processor (e.g., processing unit 102A) can execute the Easy-Mobile-agent to convert the vibration pattern and provide control signals to a vibration device (e.g., vibration device 102D) to vibrate according to the converted vibration pattern.

At block 214, the application installed on the mobile device transmits the OTP generated at block 208 to the wearable device for use in authenticating the application installed on the wearable device. For example, a processing unit in the wearable device can compare the OTP transmitted from the application installed on the mobile device with input received by the tap interface of the wearable device to authenticate the application installed on the wearable device. In particular, if the OTP transmitted from the mobile device corresponds to or matches the input received via the tap interface, the application on the wearable device can be authenticated using authentication parameters of the corresponding application on the mobile device.

It is understood in advance that although this disclosure includes a detailed description on cloud computing, implementation of the teachings recited herein are not limited to a cloud computing environment. Rather, embodiments of the present invention are capable of being implemented in conjunction with any other type of suitable computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
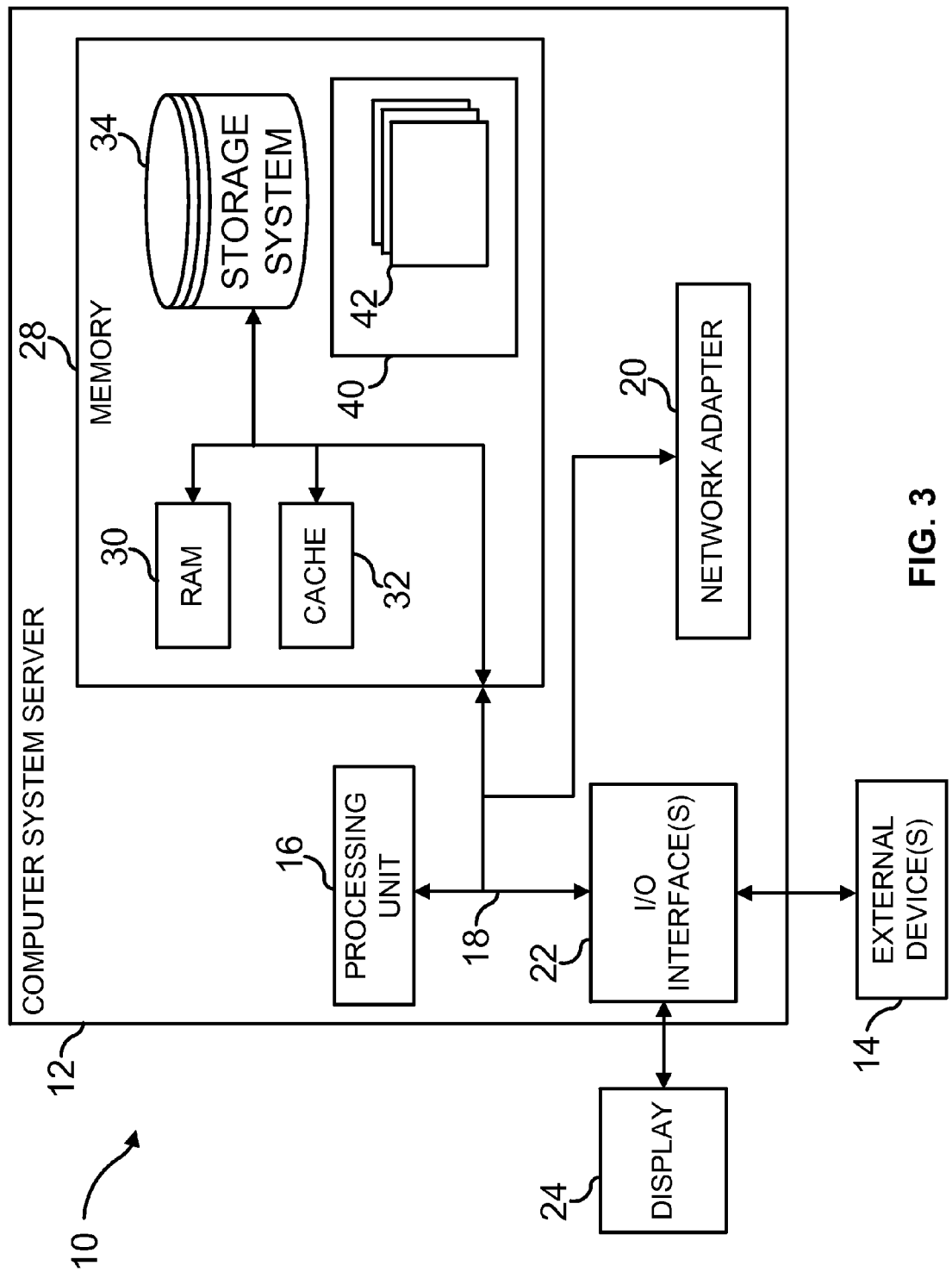
FIG. 3 depicts a cloud computing node, according to embodiments.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
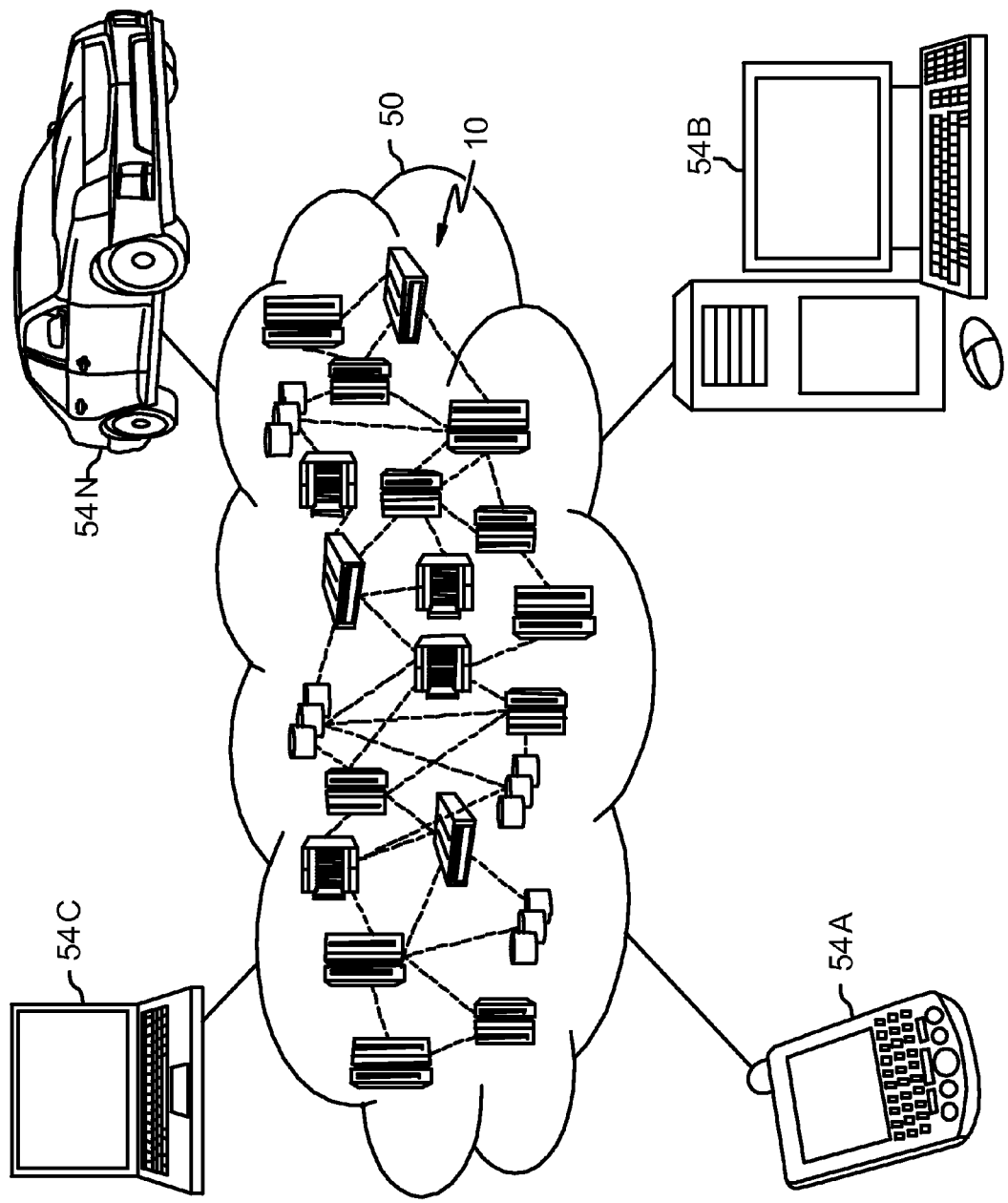
FIG. 4 depicts a cloud computing environment, according to embodiments.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 5:
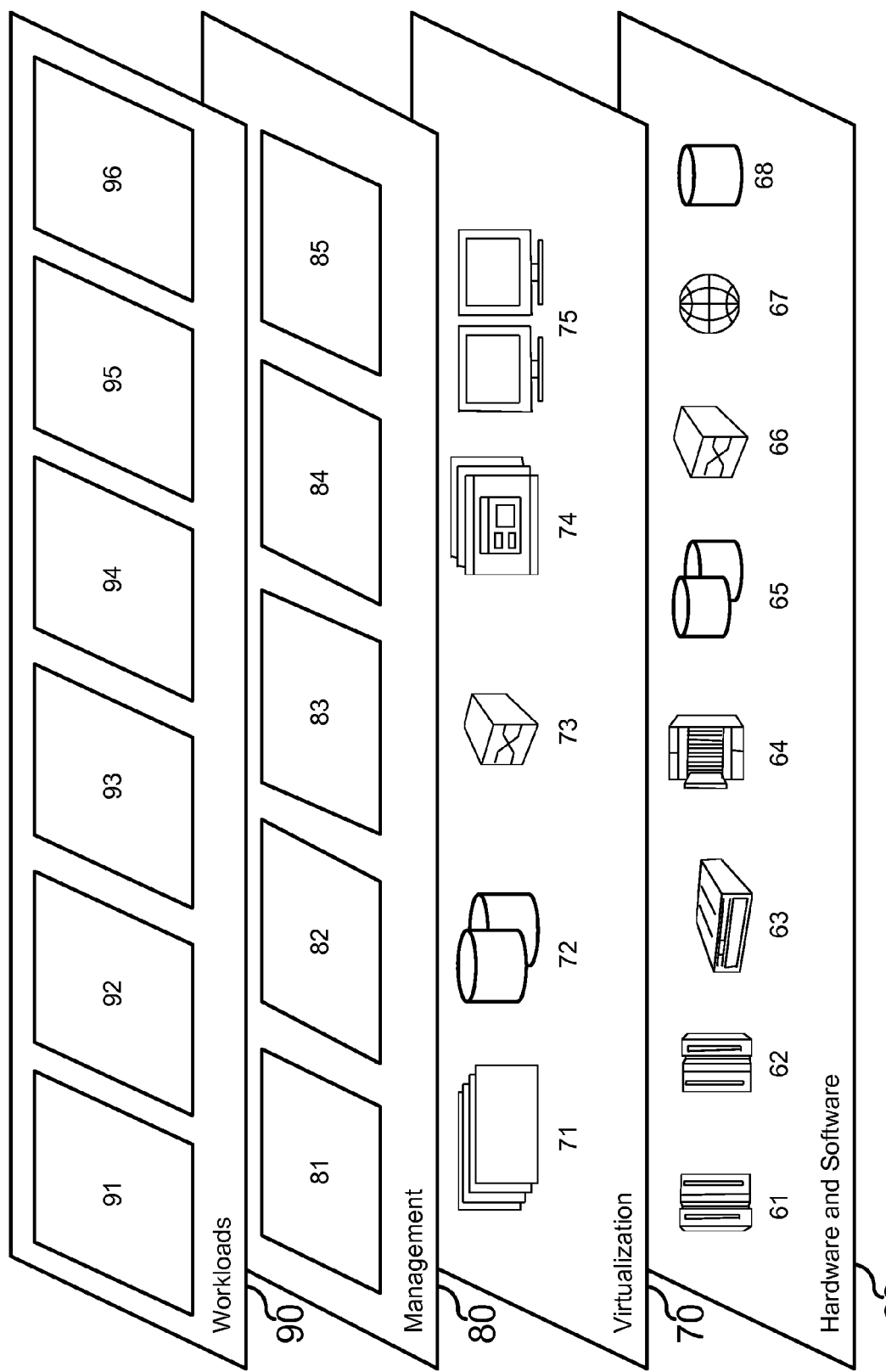
FIG. 5 depicts abstraction model layers, according to embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75. In embodiments, the virtualization layer 70 can be used to connect a mobile device (e.g., mobile device 102) with a wearable device (e.g., wearable device 104).

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and Easy-Mobile-agent 96. The Easy-Mobile-agent 96 can send and/or receive OTPs. In various embodiments, the Easy-Mobile-agent 96 can receive an OTP, convert the OTP into a vibration pattern, and transmit the vibration pattern to a mobile device. In other embodiments, the Easy-Mobile-agent 96 can compare input received by a tap interface on a wearable device (e.g., Tap Interface 104D) with an OTP received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for facilitating authentication of an application installed on a wearable device, the method comprising:
   receiving, at a mobile device, an authentication query from the application installed on the wearable device, wherein the application installed on the wearable device has not been authenticated, and wherein the authentication query is associated with the wearable device accessing the application installed on the wearable device;
   determining, at the mobile device, based upon the authentication query, whether an application installed on the mobile device, which corresponds to the application installed on the wearable device, has been previously accessed;
   providing a notification to the wearable device to notify a user when the application installed on the mobile device, which corresponds to the application installed on the wearable device, has not been previously accessed;
   determining, at the mobile device, that the application installed on the mobile device has been previously authenticated when the application installed on the mobile device has been previously accessed on the mobile device;

in response to determining that the application installed on the mobile device has been previously authenticated, generating a temporary password at the mobile device according to password generation parameters which limit one or more characteristics of the temporary password based on predetermined rules for converting temporary passwords to vibration patterns;

converting, at the mobile device, the temporary password into a vibration pattern corresponding to the temporary password according to the predetermined rules for converting temporary passwords to vibration patterns;

vibrating, at the mobile device, the vibration pattern corresponding to the temporary password; and transmitting the temporary password to the wearable device for use in comparing, at the wearable device, the temporary password transmitted from the mobile device with user input received via a tap interface on the wearable device to authenticate the application installed on the wearable device when the user input received via the tap interface of the wearable device matches the temporary password transmitted from the mobile device.

2. The method of claim 1, wherein the application installed on the mobile device and the application installed on the wearable device are instances of the same application.

3. The method of claim 1, wherein the password generation parameters include limiting the total number of digits in the temporary password to a predetermined amount.

4. The method of claim 3, wherein limiting the total number of digits includes limiting the total number of digits to three single numerical digits and symbols.

5. The method of claim 1, wherein the temporary password includes one or more digits, each digit having a predetermined association with the vibration pattern, the predetermined association being fixed.

6. The method of claim 1, wherein the temporary password includes:
a first digit, a second digit, and a third digit; and
the length of the temporary password corresponds to a security level requirement.

7. The method of claim 1, wherein converting the temporary password at the mobile device into the vibration pattern includes:
converting, at the mobile device, the temporary password into a first vibration pattern, a second vibration pattern, and a third vibration pattern, wherein the first vibration pattern corresponds to a first digit, the second vibration pattern corresponds to a second digit, and the third vibration pattern corresponds to a third digit; and
vibrating the mobile device according to the first vibration pattern, the second vibration pattern, and the third vibration pattern, wherein the first vibration pattern, the second vibration pattern, and the third vibration pattern are each separated by a pause.

8. A computer system for authenticating applications on a wearable device, the system comprising:
a mobile device, the mobile device comprising:
a memory;
a vibration device configured to vibrate the mobile device according to a vibration pattern;
a wireless interface configured to communicate with the wearable device;
a processor coupled to the memory, the vibration device, and the wireless interface;

wherein the processor in the mobile device is configured to receive an authentication query from a processor in a wearable device, in response to the processor in the wearable device accessing an application installed on the wearable device, the wearable device including a wireless interface for communication with the mobile device and the application installed on the wearable device corresponding to an application installed on the mobile device;

wherein the processor in the mobile device is configured to determine, based upon the authentication query, whether the application installed on the mobile device has been previously accessed on the mobile device;

wherein the processor is configured to output a notification to the wearable device to notify a user when the application installed on the mobile device has not been previously accessed;

wherein the processor in the mobile device is further configured to determine that the application installed on the mobile device has been previously authenticated when the processor in the mobile device has previously accessed the application installed on the mobile device;

wherein the processor in the mobile device is configured to, in response to determining the application installed on the mobile device has been previously authenticated, generate a temporary password according to password generation parameters which limit one or more characteristics of the temporary password based on predetermined rules for converting temporary passwords to vibration patterns;

wherein the processor in the mobile device is configured to convert the temporary password into a vibration pattern corresponding to the temporary password;

wherein the vibration device is configured to, in response to the processor in the mobile device converting the temporary password into the vibration pattern, vibrate the mobile device according to the vibration pattern corresponding to the temporary password;

wherein the processor in the mobile device is further configured to communicate, using the wireless interface, the temporary password to the wearable device for use by a processor in the wearable device configured to, authenticate an application installed on the wearable device based on authentication parameters of the corresponding application installed on the mobile device in response to determining that user input at a tap interface matches the temporary password communicated from the processor in the mobile device.

9. The computer system of claim 8, wherein the application installed on the mobile device and the application installed on the wearable device are instances of the same application.

10. The computer system of claim 8, wherein the temporary password includes:
a first digit, a second digit, and a third digit; and
the length of the temporary password corresponds to a security level requirement.

11. The computer system of claim 8, wherein the vibration pattern corresponding to the temporary password includes:
a first vibration pattern, a second vibration pattern, and a third vibration pattern, wherein the first vibration pattern corresponds to a first digit, the second vibration pattern corresponds to a second digit, and the third vibration pattern corresponds to a third digit; and wherein the vibration device in the mobile device is configured to vibrate the mobile device according to the first vibration pattern, the second vibration pattern, and the third vibration pattern, with each of the first vibration pattern, the second vibration pattern, and the third vibration pattern separated by a pause.

12. The computer system of claim 8, wherein the password generation parameters include limiting the total number of digits in the temporary password to a predetermined amount.

13. The computer system of claim 8, wherein the temporary password includes one or more digits, each digit having a predetermined association with the vibration pattern, the predetermined association being fixed.

14. A computer program product for facilitating authentication of an application installed on a wearable device, the computer program product comprising a computer readable storage medium having program instructions embodied therewith, wherein the computer readable storage medium is not a transitory signal per se, the program instructions executable by a processor to cause the processor to perform a method comprising:

receiving, at a mobile device, an authentication query from the application installed on the wearable device, wherein the application installed on the wearable device has not been authenticated, and wherein the authentication query is associated with the wearable device accessing the application installed on the wearable device;

determining, at the mobile device, based upon the authentication query, whether an application installed on the mobile device, which corresponds to the application installed on the wearable device, has been previously accessed;

providing a notification to the wearable device to notify a user when the application installed on the mobile device, which corresponds to the application installed on the wearable device, has not been previously accessed;

determining, at the mobile device, that the application installed on the mobile device has been previously authenticated when the application installed on the mobile device has been previously accessed on the mobile device;

in response to determining that the application installed on the mobile device has been previously authenticated, generating a temporary password at the mobile device according to password generation parameters which limit one or more characteristics of the temporary password based on predetermined rules for converting temporary passwords to vibration patterns;

converting, at the mobile device, the temporary password into a vibration pattern corresponding to the temporary password according to the predetermined rules for converting temporary passwords to vibration patterns;

outputting signals to a vibration device in the mobile device causing the vibration device to vibrate the mobile device according to the vibration pattern corresponding to the temporary password; and transmitting the temporary password to the wearable device for use in comparing, at the wearable device, the temporary password transmitted from the mobile device with user input received via a tap interface on the wearable device to authenticate the application installed on the wearable device when the user input received via the tap interface of the wearable device matches the temporary password transmitted from the mobile device.

15. The computer program product of claim 14, wherein the application installed on the mobile device and the application installed on the wearable device are instances of the same application.

16. The computer program product of claim 14, wherein the temporary password includes:

a first digit, a second digit, and a third digit; and the length of the temporary password corresponds to a security level requirement.

17. The computer program product of claim 14, wherein converting the temporary password at the mobile device into the vibration pattern includes:

converting, at the mobile device, the temporary password into a first vibration pattern, a second vibration pattern, and a third vibration pattern, wherein the first vibration pattern corresponds to a first digit, the second vibration pattern corresponds to a second digit, and the third vibration pattern corresponds to a third digit; and vibrating the mobile device according to the first vibration pattern, the second vibration pattern, and the third vibration pattern, wherein the first vibration pattern, the second vibration pattern, and the third vibration pattern are each separated by a pause.

18. The computer program product of claim 14, wherein the password generation parameters include limiting the total number of digits in the temporary password to a predetermined amount.

19. The computer program product of claim 18, wherein limiting the total number of digits includes limiting the total number of digits to three single numerical digits and symbols.

20. The computer program product of claim 14, wherein the temporary password includes one or more digits, each digit having a predetermined association with the vibration pattern, the predetermined association being fixed.

* * * * *